(12) United States Patent
Brisebois et al.

(10) Patent No.: US 9,332,441 B2
(45) Date of Patent: May 3, 2016

(54) CLOSED LOOP HETEROGENEOUS NETWORK FOR AUTOMATIC CELL PLANNING

(71) Applicant: AT&T MOBILITY II LLC, Atlanta, GA (US)

(72) Inventors: Arthur Brisebois, Cumming, GA (US); Thomas Henderson, Alpharetta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 69 days.

(21) Appl. No.: 14/329,732

(22) Filed: Jul. 11, 2014

(65) Prior Publication Data

US 2014/0342744 A1 Nov. 20, 2014

Related U.S. Application Data

(63) Continuation of application No. 13/312,858, filed on Dec. 6, 2011, now Pat. No. 8,811,994.

(51) Int. Cl.
*H04Q 7/20* (2006.01)
*H04W 16/18* (2009.01)
*H04W 24/02* (2009.01)
*H04W 24/10* (2009.01)
*H04W 84/04* (2009.01)
*H04W 88/08* (2009.01)

(52) U.S. Cl.
CPC ............. *H04W 16/18* (2013.01); *H04W 24/02* (2013.01); *H04W 24/10* (2013.01); *H04W 84/045* (2013.01); *H04W 88/08* (2013.01)

(58) Field of Classification Search
CPC ............................... H04W 16/18; H04W 24/02
USPC ......................................... 455/436, 437, 438
See application file for complete search history.

(56) References Cited

U.S. PATENT DOCUMENTS

| | | | |
|---|---|---|---|
| 6,477,367 B1 * | 11/2002 | Kim ................. | H04W 24/00 455/423 |
| 6,594,496 B2 | 7/2003 | Schwartz | |
| 6,950,678 B1 | 9/2005 | Mujtaba et al. | |
| 7,903,625 B1 | 3/2011 | Srinivas et al. | |

(Continued)

OTHER PUBLICATIONS

Office Action mailed Aug. 25, 2015 for U.S. Appl. No. 14/264,749, 22 pages.

(Continued)

*Primary Examiner* — Kwasi Karikari
*Assistant Examiner* — Randy Peaches
(74) *Attorney, Agent, or Firm* — Amin, Turocy & Watson, LLP

(57) ABSTRACT

A system and methodology that can utilize measurement data collected by a set of femto access points (FAPs), during a network listen procedure, to detect one or more areas with weak macro network coverage and/or high interference. Moreover, an automatic cell planning (ACP) component can be employed to analyze the measurement data and update a transmission parameter(s) associated with a macro access point. After the update is implemented, the ACP component can trigger another network listen procedure at the set of FAPs and receive new measurement data. The ACP component can evaluate the new measurement data to dynamically verify that the implementation of the update resulted in an improvement of macro network coverage and/or interference within the one or more areas.

20 Claims, 12 Drawing Sheets

(56) References Cited

U.S. PATENT DOCUMENTS

| | | | |
|---|---|---|---|
| 7,929,970 | B1 | 4/2011 | Gunasekara et al. |
| 7,986,973 | B2 | 7/2011 | Rhodes et al. |
| 8,412,221 | B2 | 4/2013 | Fan et al. |
| 8,498,207 | B2 | 7/2013 | Trigui et al. |
| 8,538,435 | B2 | 9/2013 | Immendorf et al. |
| 8,543,112 | B2 | 9/2013 | Fox et al. |
| 8,589,541 | B2 | 11/2013 | Raleigh et al. |
| 8,724,467 | B2 | 5/2014 | Le Faucheur et al. |
| 8,750,896 | B2 | 6/2014 | Brisebois et al. |
| 8,831,679 | B2 | 9/2014 | Bajj et al. |
| 2009/0296635 | A1* | 12/2009 | Hui .................. H04W 48/10 370/328 |
| 2010/0136996 | A1 | 6/2010 | Han et al. |
| 2013/0272132 | A1 | 10/2013 | Heo et al. |
| 2014/0036656 | A1 | 2/2014 | Chou et al. |
| 2014/0146681 | A1 | 5/2014 | Gusavec et al. |
| 2014/0147125 | A1 | 5/2014 | Chow |

OTHER PUBLICATIONS

Li, et al., "Real Time Radio Coverage Monitoring in Selforganizing Networks with User Feedback". 2012 IEEE Fifth International Workshop on Selected Topics in Mobile and Wireless Computing. Oct. 2012, 8 pages.

Akyildiz, et al., "Next generation/dynamic spectrum access/cognitive radio wireless networks: A survey". Computer Networks 50 (2006) 2127-2159. www.elsevier.com/locate/comnet. Retrieved on Sep. 16, 2014, 33 pages.

"What is Mentum Planet?" published online at [http://www.mentum.com/index.php?page=mentum-planet&h1=en_US] archived version dated Nov. 19, 2011, retrieved from Wayback Machine on Feb. 11, 2015, 3 pages.

Iskander, et al., "Antenna Array Designs with Advanced Beam Steering Capabilities". http://www.ursi.org/proceedings/procGA08/papers/B04p1.pdf. URSI General Assembly held Aug. 7-16, 2008 in Chicago. Last accessed Feb. 14, 2014. 4 pages.

"Mentum Cell Planner". http://www.mentum.com/index.php?page=cellplanner&hl=en_US. Last accessed Dec. 30, 2011. 1 page.

"Mentum Cell Planner". http://www.mentum.com/index.php?page=mentum-planet&hl=en_US. Last accessed Dec. 30, 2011, 1 page.

"CelPlanner", http://www.celplan.com/Products/CP.asp?Plan=true. Last accessed Dec. 30, 2011, 1 page.

Equilateral Technologies, "Wireless Network Planning and Optimization—RF Propagation Prediction", http://www.equilateral.com/broadband.html#optimization, last accessed Mar. 21, 2012.

Office Action dated Jul. 12, 2012 for U.S. Appl. No. 13/312,858, 29 pages.

Office Action dated Mar. 18, 2013 for U.S. Appl. No. 13/312,858, 22 pages.

Chiao et al., MEMS Reconfigurable Vee Antenna, 1999 IEEE MTT-S Digest, retrieved Oct. 23, 2013, pp. 1515-1517-1.

Office Action dated Oct. 23, 2013 for U.S. Appl. No. 13/272,273, 38 pages.

Office Action dated Aug. 1, 2013 for U.S. Appl. No. 13/312,858, 25 pages.

Office Action dated Dec. 30, 2013 for U.S. Appl. No. 13/222,555, 25 pages.

Office Action dated Dec. 19, 2013 for U.S. Appl. No. 13/312,858, 25 pages.

Equilateral Technologies"Broadband-eQ Network Planning Software". http://www.equilateral.com/broadband.html#optimization. Last accessed Dec. 30, 2011, 2 pages.

Notice of Allowance dated Jan. 30, 2014 for U.S. Appl. No. 13/272,273, 29 pages.

Notice of Allowance dated Dec. 17, 2015 for U.S. Appl. No. 14/264,749, 15 pages.

* cited by examiner

CLOSED LOOP HETEROGENEOUS NETWORK FOR AUTOMATIC CELL PLANNING

CROSS-REFERENCE TO RELATED APPLICATION

This application is a continuation of, and claims priority to, U.S. patent application Ser. No. 13/312,858, filed Dec. 6, 2011, and entitled "CLOSED LOOP HETEROGENEOUS NETWORK FOR AUTOMATIC CELL PLANNING", the entirety of which is hereby incorporated herein by reference.

TECHNICAL FIELD

The subject disclosure relates to wireless communications and, more particularly, to a closed loop heterogeneous network for automatic cell planning.

BACKGROUND

Wireless service providers are observing an exponential growth in mobile communications due to both an increase in consumer demand and commercial requirements. To ensure customer satisfaction, wireless service providers aim to deliver a high quality service at any location, to facilitate reliable and efficient mobile communications. Moreover, to improve wireless coverage and reduce dead zones, wireless service providers can typically add and/or replace front-end equipment to realize effective bandwidth increases. In addition, femtocells (building-based wireless access points interfaced with a wired broadband network), can be deployed to improve indoor wireless coverage, and to offload a mobility radio access network (RAN) operated by the wireless service provider. Improved indoor coverage includes stronger signal and improved reception (e.g., voice, sound, or data), ease of session or call initiation, and session or call retention as well.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later. It will also be appreciated that the detailed description may include additional or alternative embodiments beyond those described in this summary.

The systems and methods disclosed herein, in one aspect thereof, can locate and better serve areas of poor macro network coverage and/or high interference, for example, hot spots, based on real-time femto measurement data and dynamic macro network beam tuning/steering. Femto access points (FAPs) can detect and/or measure signals transmitted by one or more macro access points, and can forward pertinent measurement data to an automatic cell planning (ACP) tool. Based on an analysis of the measurement data received from one or more FAPs, the ACP tool can identify a hot spot location, and adjust a parameter(s) associated with the one or more macro access points, to improve macro coverage and/or interference at the hot spot location. Further, the ACP tool can verify that the adjustment to the parameter(s) accomplished the improvement in macro coverage and/or interference at the hot spot location and/or did not create new issues, based on receiving new measurement data from the FAPs.

Another aspect of the disclosed subject matter relates to a method that can be employed to facilitate automated macro antenna tuning based on results of a network listen procedure implemented by femto access point. In particular, the method can include receiving the results, indicative of a macro network coverage surrounding the femtocell, from the femto access point, and aggregating, consolidating, and/or analyzing the results to locate a hot spot and/or dead zone. Further, the method can include determining and updating one or more parameters (e.g., antenna bearing and/or tilt) for steering and/or tuning antenna(s) at a macro access point. Furthermore, the method can include initiating another network listen procedure, receiving new results from the femto access point, and verifying, in real-time, that the determining and updating of the one or more parameters improved macro network coverage and/or interference at the hot spot/dead zone and/or did not create new coverage related issues.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
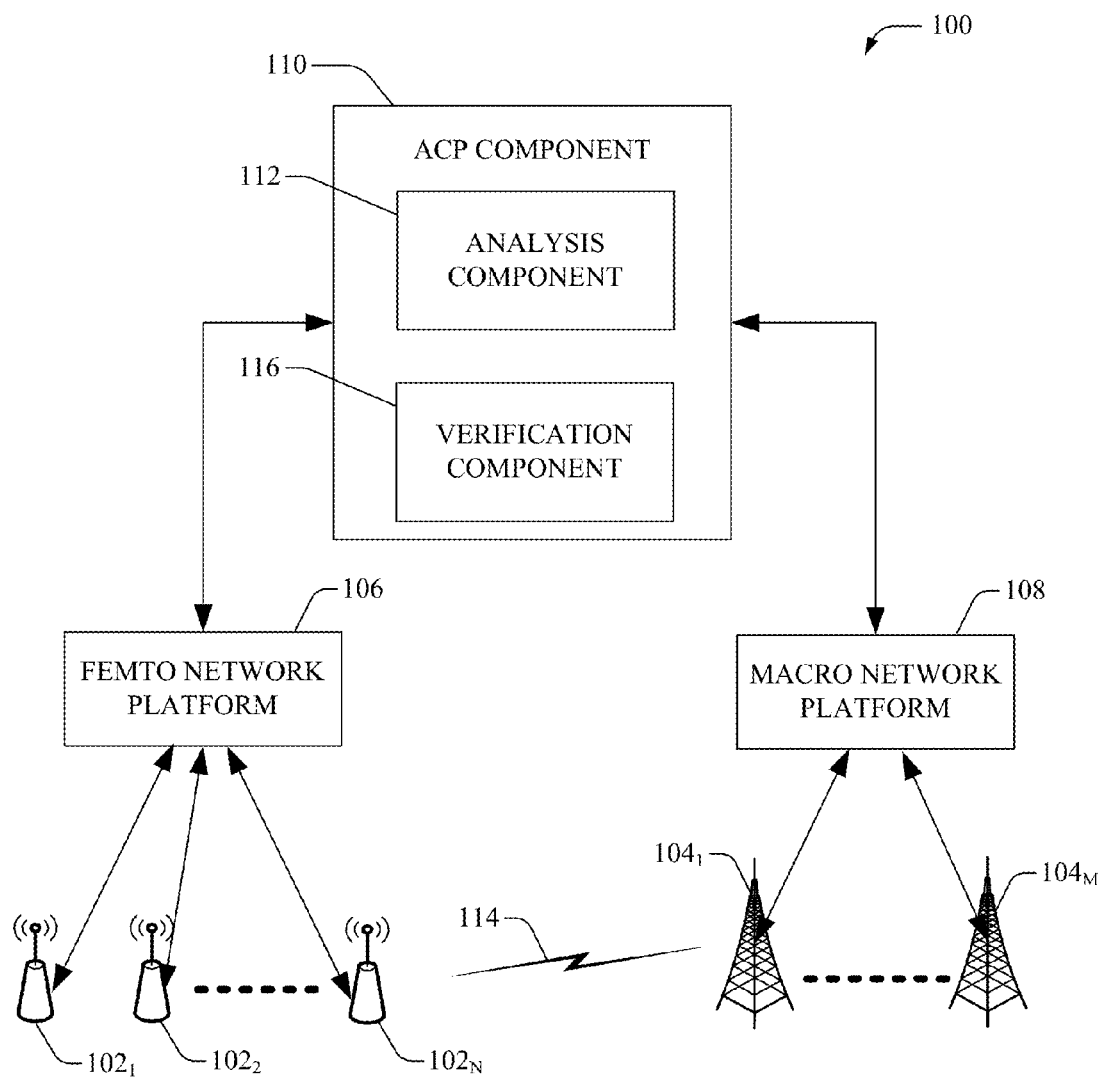
FIG. 1 illustrates an example system that can improve macro network coverage for areas with poor macro network coverage or high interference.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

In addition, the words "example" and "exemplary" are used herein to mean serving as an instance, or illustration. Any aspect or design described herein as "example" or "exemplary" is not necessarily to be construed as preferred or advantageous over other aspects or designs. Rather, use of the word example or exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms "access point," "base station," "Node B," "site," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. Furthermore, the terms "user," "subscriber," "customer," "consumer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, the terms the terms "femtocell", and "femto" are utilized interchangeably, while "macro cell" and "macro" are utilized interchangeably herein.

The systems and methods disclosed herein provide a means to improve macro network coverage, by dynamic beam tuning, based on an analysis of femto measurement data. In contrast to conventional systems, the systems and methods disclosed herein can detect hot spots issues, identify macro beam changes to resolve the hot spot issues, and receive real-time feedback indicative of a modification in macro network coverage in response to the implementation of the macro beam changes.

Aspects or features of the subject specification can be exploited in substantially any wireless communication technology; e.g., Wi-Fi, Global System for Mobile Communications (GSM), Universal Mobile Telecommunications System (UMTS), Worldwide Interoperability for Microwave Access (WiMAX), Enhanced General Packet Radio Service (Enhanced GPRS), Third Generation Partnership Project (3GPP) Long Term Evolution (LTE), Fourth Generation (4G) LTE, Third Generation Partnership Project 2 (3GPP2) Ultra Mobile Broadband (UMB), High Speed Packet Access (HSPA), Zigbee or another IEEE 802.XX technology. Additionally, substantially all aspects of the subject specification can be exploited in legacy telecommunication technologies.

Referring initially to FIG. 1, there illustrated is an example system 100 that can improve macro network coverage and/or interference based on data collected by femto access points (FAPs), according to an aspect of the subject specification. The system 100 utilizes measurement(s) received from one or more FAPs ($102_1$-$102_N$) to identify a location of a dead zone or a hot spot (e.g., area with poor macro network coverage or high interference). According to an embodiment, a number (N; wherein N can be an integer) of FAPs ($102_1$-$102_N$) can be deployed within the wireless service provider's network. FAPs ($102_1$-$102_N$) are building-based wireless access points interfaced with a wired broadband network, that can be deployed to improve indoor wireless coverage, and to offload traffic from a mobility radio access network (RAN) operated by a wireless service provider. Improved indoor coverage can include one or more of stronger signal, increased bandwidth, and improved reception (e.g., video, sound, or data), ease of session or call initiation, and session or call retention, as well. Offloading traffic from the RAN can reduce operational and transport costs for the service provider since a lesser number of end users consumes macro RAN over-the-air radio resources (e.g., radio traffic channels), which are typically limited. With the rapid increase in utilization of communications networks and/or devices, mobile data communications have been continually evolving due to increasing requirements of workforce mobility, and, services provided by femtocells can be extended beyond indoor coverage enhancement.

In one aspect, one or more of the FAPs ($102_1$-$102_N$) can collect macro cell measurements 114, based on a network listen and/or network sniffing procedure. As an example, the network listen and/or network sniffing procedure can be performed periodically, at a predefined time, dynamically and/or on-demand (e.g., requested by core network). Additionally or optionally, the FAPs ($102_1$-$102_N$) can determine a number of attachment attempts, made by user equipments (UEs) within their respective femtocell coverage areas. As an example, the UEs can be whitelisted, blacklisted and/or not be associated with access control lists of the FAPs ($102_1$-$102_N$). In one example, one or more of the FAPs ($102_1$-$102_N$) can provide the measurements and number of attachment attempts, to an automatic cell planning (ACP) component 110, via a femto network platform 106. In another example, one or more of the FAPs ($102_1$-$102_N$) can notify the ACP component 110, only when the measurements fall below a predefined threshold value, which can be indicative of poor macro network coverage or high interference, and/or when the number of attachment attempts exceeds another predefined threshold value.

According to an embodiment, the ACP component 110 can include an analysis component 112, which can aggregate and analyze the measurements and/or notifications received from the FAPs ($102_1$-$102_N$). Moreover, the analysis component 112 can utilize the measurements and/or notifications to identify areas having weak (e.g., below a predefined threshold value) macro network coverage or interference (e.g., multiple servers overlapping). In one example, the analysis component 112 can determine a set of most significant victim (e.g., interfered) and/or rogue (e.g., interfering) macro sectors, for example, served by base stations ($104_1$-$104_M$; where M can be any integer), requiring attention, based on the data received from the femto network platform 106. Further, the analysis component 112 can utilize the data to identify the magnitude of change (e.g., signal strength increase or interference reduction) required to meet a desired/target performance criterion. In one aspect, the analysis component 112 can determine a set of best-fit changes made to one or more parameters (e.g., antenna tilt, antenna height, azimuth, beam width changes, etc.) associated with one or more of the base stations ($104_1$-$104_M$) that affect the desired/target improvements in macro network coverage and/or interference. Moreover, the ACP component 110 can initiate and/or implement the set of best-fit changes via automated operations, administration and management (OAM).

In one example, once the OAM verifies changes are implemented, the ACP component 110 can trigger new network listen measurements in one or more of the FAPs ($102_1$-$102_N$). Moreover, the FAPs ($102_1$-$102_N$) can report new measurement results back towards the ACP component 110, via the femto network platform 106 and the verification component 116 can evaluate the new data to ensure that the target/estimated improvement in macro network coverage and/or interference has been achieved and/or that no new problems have been created due to the changes. Additionally or alternatively, the verification component 116 can confirm/validate that interference has been reduced as desired/estimated and/or that no new coverage and/or interference problems have been created. According to an aspect, if the results of the verification meet corresponding targets, the process is complete. If not, the analysis component 112 can repeat the analysis with the new measurement results and continue to modify parameters in one or more the macro cell sites ($104_1$-$104_M$) until the desired result is accomplished and verified.

In one example, base stations ($104_1$-$104_M$) can be most any cell sites, for example, locations at which antennas (e.g., transmitter/receivers, transceivers) and electronic communications equipment are placed. As an example, a cell site can include communications equipment to create a cell in a cellular network. The communications equipment can include an access point, a Node B, an evolved Node B, or the like. Moreover, on receiving instructions from the ACP component 110, the base stations ($104_1$-$104_M$) can re-direct or steer one or more antennas and/or change parameter values, such as but not limited to, antenna height, antenna tilt, beam width, azimuth, etc. In addition, other transmission parameters, such as, but not limited to, the transmission power of the one or more antennas of base stations ($104_1$-$104_M$) can be modified to improve macro coverage and/or interference at the hot spots. Although the ACP component 110 is illustrated to be externally coupled to the femto network platform 106 and the macro network platform 108, it can be appreciated that the ACP component 110 can reside within the femto network platform 106 or the macro network platform 108, or be distributed between the femto network platform 106 and the macro network platform 108. In contrast to prediction-based simulations utilized by conventional systems, system 100 utilizes actual usage data collected by FAPs ($102_1$-$102_N$) and thus improves accuracy for hot spot detection. Further, the system 100 can implement a feedback loop that provides a quick, accurate, and efficient approach to validate and/or verify that the hot spot issues have been resolved, thereby eliminating or reducing manual data collection (by field technicians).

Figure 2:
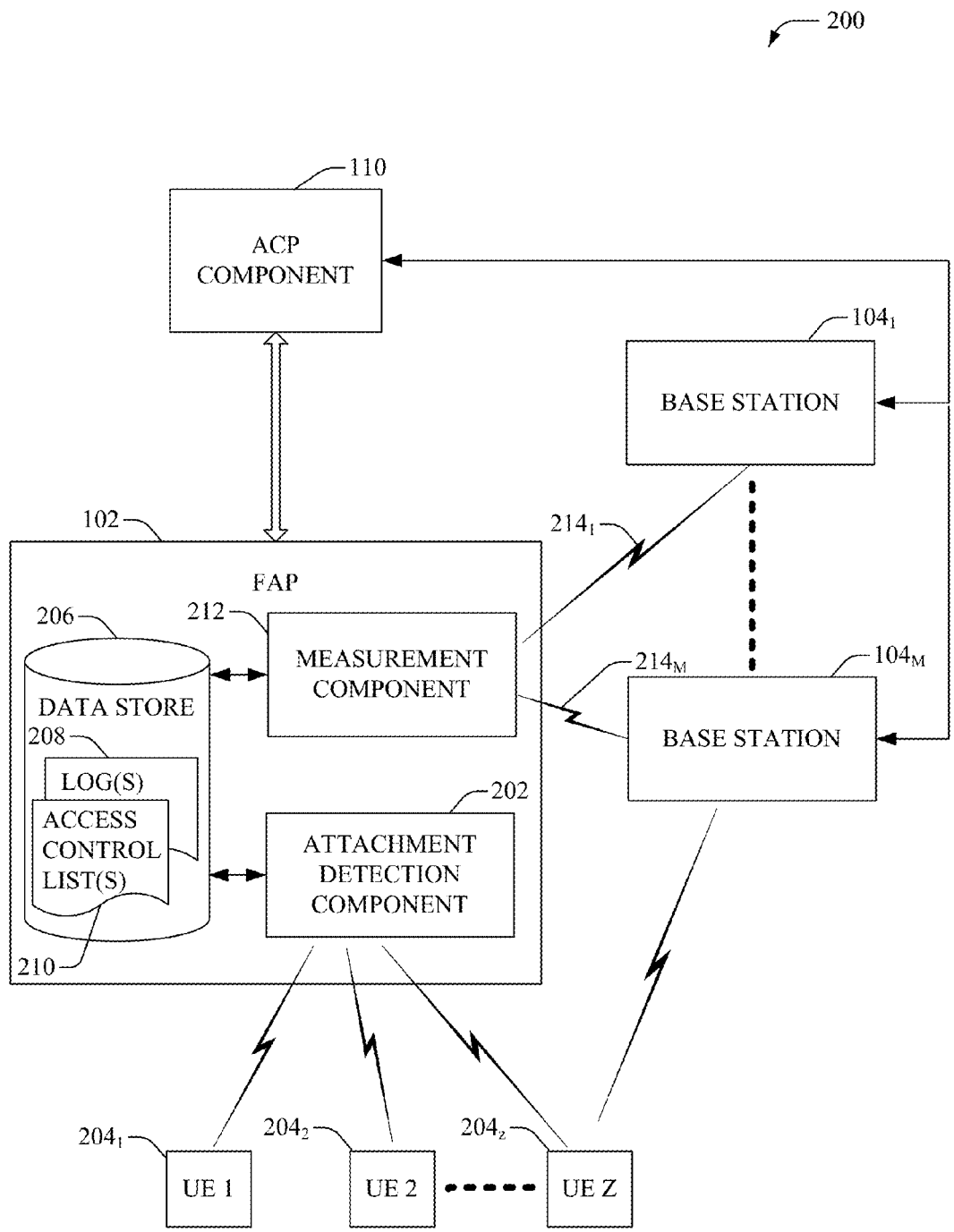
FIG. 2 illustrates an example system for real-time detection of hot spots.

Referring now to FIG. 2, there illustrated is an example system 200 for real-time detection of hot spots in accordance with an aspect of the subject disclosure. The system 200 can include a wireless communication network (e.g., cellular macro network) served by a base stations ($104_1$-$104_M$). Moreover, base stations ($104_1$-$104_M$) can provide macro coverage that is generally intended for servicing wireless mobile devices. To improve indoor wireless coverage, and/or to off-load the mobility radio access network (RAN), femtocells, such as, a femtocell, served by a FAP 102, can be deployed within system 200. It can be appreciated that services provided by the femtocell can be extended beyond indoor coverage enhancement; for example, the femtocell can be utilized in areas wherein macro coverage is not poor or weak. The femtocell can cover an area that can be determined, at least in part, by transmission power allocated to FAP 102, path loss, shadowing, and so forth. The FAP 102 can facilitate communication between authorized user equipment (UE) within a femtocell coverage area and a service provider's core network. In particular, the communication (e.g., voice and/or data traffic) between the FAP 102 and the core network is routed through a backhaul broadband wired network, for example, an optical fiber backbone, twisted-pair line, T1/E1 phone line, Digital Subscriber Cable (DSL), coaxial cable, and/or the like. It can be appreciated that the FAP 102 can be substantially similar to FAPs ($102_1$-$102_N$). Further, the ACP component 110 and base stations ($104_1$-$104_M$) can include functionality, as more fully described herein, for example, with regard to system 100.

In one embodiment, the FAP 102 can include a measurement component 212, which can monitor, sense, scan, and/or measure a radio environment associated with one or more macro cells surrounding the FAP 102. For example, the measurement component 212 can perform a network listen procedure and obtain measurements $214_1$-$214_M$ for detecting signal strength(s) and/or downlink rate of signal(s) of the surrounding base station(s) $104_1$-$104_M$. As an example, the measurements $214_1$-$214_M$ collected by FAP 102 can include each detected macro cell measurement and the x/y/z coordinates of the measurement. Moreover, the measurement component 104 can analyze the signal strength(s), for example, by comparing the signal strength(s) to a predefined threshold value. If the signal strength(s) is less than the predefined threshold value, poor macro coverage can be detected at the location of the femtocell. Alternatively, if the signal strength(s) is greater than the predefined threshold value, sufficient and/or reliable macro coverage can be detected at the location of the femtocell. As an example, the predefined threshold value can specify minimum requirements, such as, but not limited to, signal strength, uplink and/or downlink rate, etc., below which communication would be unsatisfactory (e.g., poor call quality, slow downloads, and/or dropped calls) to a customer. In addition, the measurement component 212 can also compute average signal strength based on data from multiple network listen procedures and/or generate most any statistical data to identify poor/weak macro coverage. According to an embodiment, the network listen procedure can be performed by the measurement component 212, periodically, at a preset time, on power-up, during idle-mode of the FAP 102, and/or can be triggered on-demand by the ACP component 110 and/or by a nearby FAP (not shown). Further, in an example scenario, wherein interference is detected, the FAP 102 can trigger network listen measurements in nearby FAPs. The respective measurement components of the in nearby FAPs can collect network listen measurements and provide the measurement data to the ACP 110 for further analysis.

In one embodiment, traffic at the femtocell can be determined by an attachment detection component 202. Moreover, the attachment detection component 202 can identify attachment attempts made by UEs ($204_1$-$204_Z$; where Z can be any integer value) within the femtocell to connect to the FAP102. The volume of attachment attempts (e.g., for a specific time period, such as but not limited to, within a few minutes, an hour, a day, a week, etc.) can be used to locate and determine periods of high traffic at a location at which the FAP 102 is deployed. In other words, attachment attempts can occur more often in dense user areas and less often in isolated areas, and thus the frequency of attachment attempts can be an indicator of nearby (e.g., within the relatively small radius of the FAP 102) user density. Moreover, the volume of attach attempts can be used to localize, predict and weight the potential wireless communication traffic within and/or between venues. This weighting shall ensure that automatic frequency and/or cell tuning algorithms benefit the highest density of users.

As an example, UEs ($204_1$-$204_z$) can include most any electronic communication devices such as, but not limited to, most any consumer electronic devices, for example, a digital media player, a digital photo frame, a digital camera, a cellular phone, a personal computer, a tablet computer, a personal digital assistant (PDA), a smart phone, a laptop, a gaming system, etc. Further, UEs ($204_1$-$204_z$) can also include LTE-based devices, such as, but not limited to, most any home or commercial appliance that includes an LTE radio. It can be appreciated that the UEs ($204_1$-$204_z$) can be mobile, have limited mobility and/or be stationary.

According to an aspect, the attachment detection component 202 can compute and/or record a total number of attachment attempts, a number of attachment attempts made by whitelisted UEs, a number of attachment attempts made by blacklisted UEs, and/or a number of attachment attempts made by visitor UEs (e.g., UEs that are not included on an access control list 210 associated with the FAP 102). As an example, access control list 210 can be stored within data store 206 and/or retrieved/accessed from a network database (not shown). The access control list 210 can provide functionality to authorize, permanently or temporarily, or deny or revoke access to specific subscribers, or UEs, and can include white list(s) or black list(s). Moreover, the attachment detection component 202 can utilize data from the access control list 210 to calculate the number of attachment attempts made by whitelisted UEs, the number of attachment attempts made by blacklisted UEs, and/or the number of attachment attempts made by visitor UEs. Additionally or alternatively, the attachment detection component 202 can also identify a number of attachment attempts made by unique UEs based on an identifier, such as, but not limited to an International Mobile Subscriber Identity (IMSI), an International Mobile Equipment Identity (IMEI), a Mobile Station International Subscriber Directory Number (MSISDN), Subscriber Identity Module (SIM), or a serial number of a UE.

In one aspect, the attachment detection component 202 can provide the data relating to the number of attachment attempts (e.g., total, by whitelisted/blacklisted or visitor UEs) to the ACP component 110 (e.g., over the backhaul broadband wired network). Moreover, the ACP component 110 can reside within or be distributed between a femto network platform, macro network platform and/or core network node. The ACP component 110 can assign a higher weighting contribution to a FAP with more attachment attempts, than a FAP with less attachment attempts. This weighting can ensure that automatic antenna tuning algorithms benefit the highest concentrations of users.

The ACP component 110 receives measurement data and attachment attempt data from FAP 102 and can determine location of a hot spot based on an analysis of the attachment attempt data (e.g., by employing analysis component 112). Although only one FAP, FAP 102, is illustrated, it can be appreciated that the ACP component 110 can collect, aggregate and/or weigh attachment attempt data measured by multiple FAPs deployed within the service provider's network. Moreover, the ACP component 110 can access, determine, or obtain, a geographical location of the FAP 102 to locate the area of the hot spot/dead zone. As an example, the location of the FAP 102 is known at the time of activation, for example, based on global positioning system (GPS) coordinates or user input. Further, the ACP component 110 can identify base station(s) nearest to the location of the FAP 102, including determine interfering and/or interfered base stations, such as one or more of base stations ($104_1$-$104_M$), and instruct the base stations ($104_1$-$104_M$) to modify one or more transmission parameters. In one example, the ACP component 110 can instruct one or more of the base stations ($104_1$-$104_M$) to modify the phase and/or relative amplitude of a signal transmitted at each transmitter of its antenna(s). In another example, the ACP component 110 can instruct one or more of the base stations ($104_1$-$104_M$) to modify an antenna bearing and/or tilt suited for the highest user concentration locations reported by FAP 102. Accordingly, the one or more of the base stations ($104_1$-$104_M$) can implement the requested modifications.

Once the modifications have been implemented, the ACP component 110 can trigger the network listen procedure by the measurement component 212, which in turn can collect new measurements from the base stations ($104_1$-$104_M$) and deliver the new measurement data to the ACP component 110. The ACP component 110 (via verification component 116) can determine whether the modifications achieved the target/estimated improvements in macro network coverage at the FAP 102 and/or whether the modifications created new issues (e.g. interference). If further improvement in macro network coverage is required and/or newly created issues are to be resolved, ACP component 110 (via analysis component 112) can re-evaluate the new measurement data and readjust the one or more parameters of the one or more of the base stations ($104_1$-$104_M$). Moreover, the measurement and modification can be repeated until macro network coverage is improved to a predefined/target value or is within a predefined range, and/or newly created issues are resolved. Accordingly, system 200 forms a closed loop heterogeneous network to dynamically improve macro network coverage.

In one embodiment, the attachment attempt data and/or measurement data collected by the attachment detection component 202 and the measurement component 212 respectively, can be logged (208) within data store 206. Although data store 206 is depicted to reside within the FAP 102, it can be appreciated that the data store 206 can be locally or remotely coupled to FAP 102. It can be appreciated that the data store 206 can include volatile memory(s) or nonvolatile memory(s), or can include both volatile and nonvolatile memory(s). By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases) of the subject systems and methods is intended to comprise, without being limited to, these and any other suitable types of memory.

Figure 3:
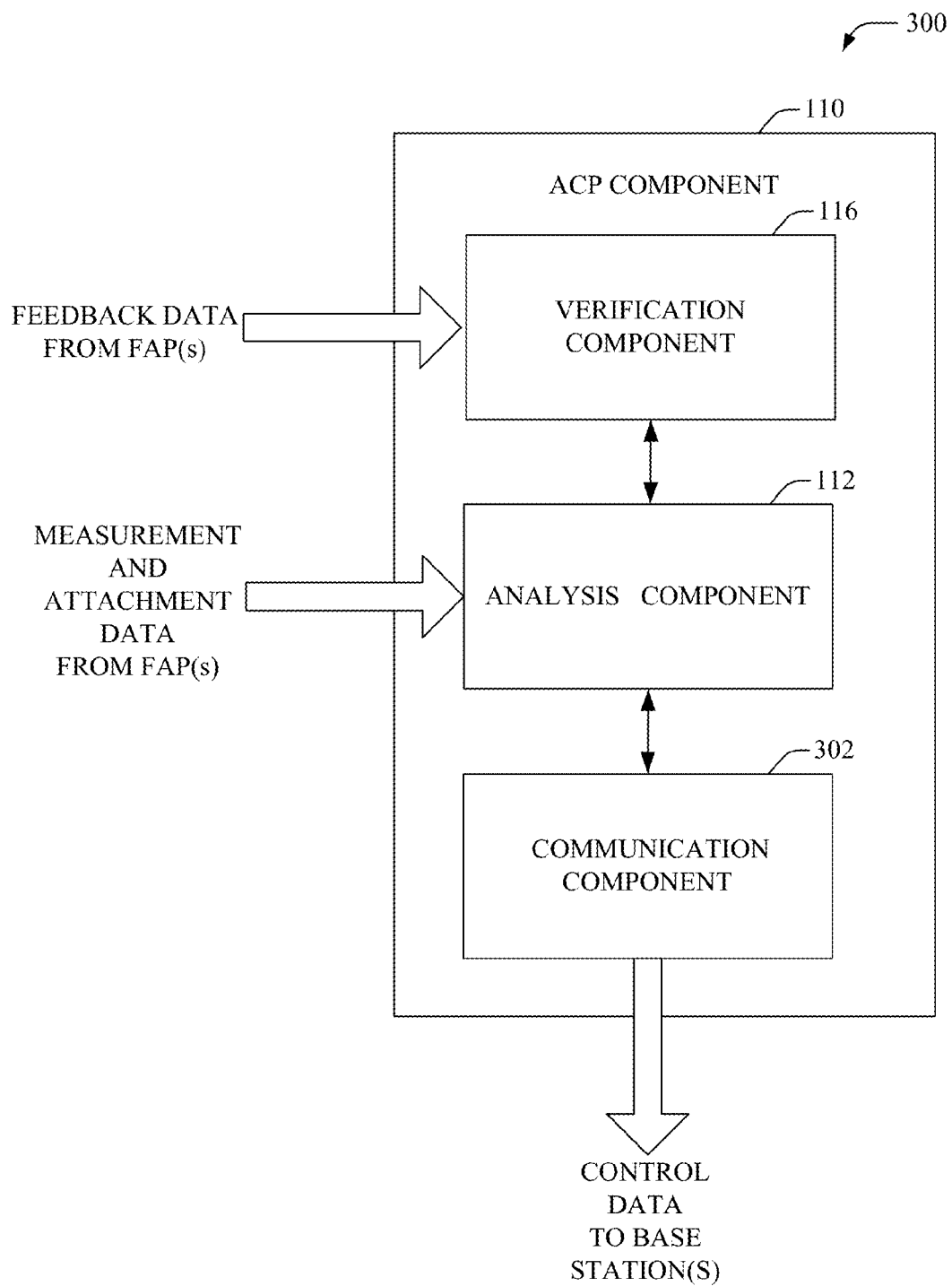
FIG. 3 illustrates an example system that leverages measurements obtained by a femto access point (FAP) to improve macro network coverage in a location with a high concentration of users.

Referring now to FIG. 3, there illustrated is an example system 300 that leverages measurements obtained by a FAP 102 to improve macro network coverage in a location with a high concentration of users. Moreover, system 300 can provide a relatively simple, fast, and inexpensive approach to dynamically adjust transmission parameters to provide better macro network coverage in hot spot/dead zone location, based on real-time femto measurements and actual network usage data, according to an example embodiment. For example, system 300 can leverage the location-specific-awareness attributes of FAPs to improve the adaptability and capacity of macro access points, which may comprise relatively simple and/or inexpensive beam-steering antennas. Moreover, the system 300 can utilize femto attachment attempt data to quantify and locate concentrations of idle-mode UEs, before the UEs initiate communication (e.g., prior to the UE making a call). The ACP component 110, the analysis component 112, and the verification component 116 can include functionality, as more fully described herein, for example, with regard to systems 100 and 200.

According to an embodiment, the analysis component 112 can receive initial measurement data measured/collected by a FAP(s) deployed in various locations, such as, but not limited to, homes, offices, warehouse, industrial plant, factories, stadiums, theatres, concert arenas, shopping malls, etc. As an example, FAP(s), connected to the venue DSL facilities, can be relatively low capacity and cost. Moreover, the FAP(s) generally provide access to an authorized list of users (e.g., venue employees). However, whilst idle, nearby visitor UEs can still attempt to attach to the FAP(s). Attachment attempts can occur more often in dense user areas, and less often in isolated areas, thus providing the analysis component 112 with an indicator of user density and/or migration, for example, within the relatively small radius of the respective FAP(s).

According to an embodiment, measurement received from the FAP(s) comprises each detected macro cell measurement and/or the x/y/z coordinates of the measurement. In one example, the analysis component 112 can obtain or aggregate measurement (and/or attachment attempt) data from a threshold of minimum FAP(s), distributed over a specified area, to ensure a sufficient femtocell penetration within a defined hot spot. This threshold can ensure that sufficient data is processed to validate the macro cell modification(s). In one aspect, the analysis component 112 can identify the hot spot (e.g., polygon) of multiple interferers by grouping the femtocells with multiple detected macro cells within a defined threshold. Based on identifying multiple femtocells in a specific area, with multiple macro servers within X dB (wherein X is any numerical value), the hot spot can be determined. As an example, the hot spot can be imported or identified by the analysis component 112 as a problem area and/or a Monte Carlo analysis can be run by the analysis component 112 to determine the modification(s) that can be implemented at the macro sites, which surround the area of the hot spot, to fix the issue and/or improve the network coverage. The modifications can include changes to transmission parameters, such as, but not limited to, radiation center, antenna tilts, antenna change out modifying the H or V plane, antenna height, azimuth, beam width, transmission power, etc.

Further, the analysis component 112 can also utilize the attachment attempt data to localize, predict and/or weigh the potential wireless data traffic within and between venues of the FAP(s). For example, measurements from FAP(s) with a greater number of attachment attempts can have more result weighting contribution than measurements taken from FAP(s) with less attachment attempts. Additionally or optionally, the analysis component 112 can also assign weights to FAP(s) based on the type of UEs attempting to access the FAP(s). For example, an attachment attempt made by a visitor UE (e.g., unauthorized to access the FAP) can be employed to provide a higher weighting contribution than an attachment attempt made by a whitelisted UE (e.g., unauthorized to access the FAP); since the white listed UE can utilize femto resources for communication. Further, in one example, if the number of whitelisted UEs trying to attach to a FAP is greater than the capacity of the FAP, the attachment attempt made by the whitelisted UE can provide a weighting contribution that equals the weighting contribution provided by a visitor UE. Furthermore, number of attachment attempts made by unique UEs at different FAPs can also be compared by the analysis component 112 to accurately identify areas of high user density/concentration. It can be appreciated that the subject system is not limited to the above examples for weighting contribution and most any policy (e.g., specified by the service provider/operator) for assigning weights to FAPs based on attachment attempt data can be utilized. In one aspect, based on the weighting, the analysis component 112 can identify modification(s) for macro sites serving areas including FAP(s) having a high weighting. Additionally or alternatively, the weighting can be utilized to prioritize locations, at which macro coverage and/or interference improvements can be implemented. Moreover, the weighting can ensure that automatic antenna tuning algorithms benefit the highest concentrations of users.

Further, the ACP component 110 can include a communication component 302 that can transmit/deliver control data to one or more macro access points identified/selected by the analysis component 112. The control data can include instructions for implementing the modification(s), for example, to the transmission parameters. In one example, on receiving confirmation that the modification(s) have been implemented, the ACP component 110, can trigger a network listen procedure in the FAP(s) and receive feedback data based on the results of the network listen procedure. In another example, the network listen procedure can be automatically and/or periodically initiated by the FAP(s) and the feedback data can be delivered to the ACP component 110. The verification component 116 can validate and/or verify the feedback data to ascertain that the macro network coverage in the hot spot/dead zone areas has improved (e.g. to the target level(s)). In addition, the verification component 116 can determine whether any new problems (e.g., new hot spots/dead zones or interferences issues) have been created, as a result of the modification(s). In one example, if the verification component 116 confirms that interference has been reduced to the target level(s) and no new coverage problems have been introduced, the automatic cell tuning process can be terminated (e.g., until new measurement and/or attachment attempt data is received). Otherwise, the verification component 116 can provide the feedback data to the analysis component 112, which in turn can analyze the feedback data to generate a new set of modification(s). Accordingly, automatic cell tuning process can be repeated until target interference levels are reached and macro network coverage issues are resolved.

In one aspect, the system 300 can utilize the femtocell measurement data to validate the macro cell modifications immediately (or almost immediately) after the modification has been implemented. Moreover, a high concentration of femtocells distributed over a hot spot can provide many points of geographically based data for validation. Accordingly, system 300 can provide a flexible, fast, and cost effective system for real-time and/or event driven, adjustment and/or improvement of macro network coverage, according to an example embodiment.

Figure 4A:
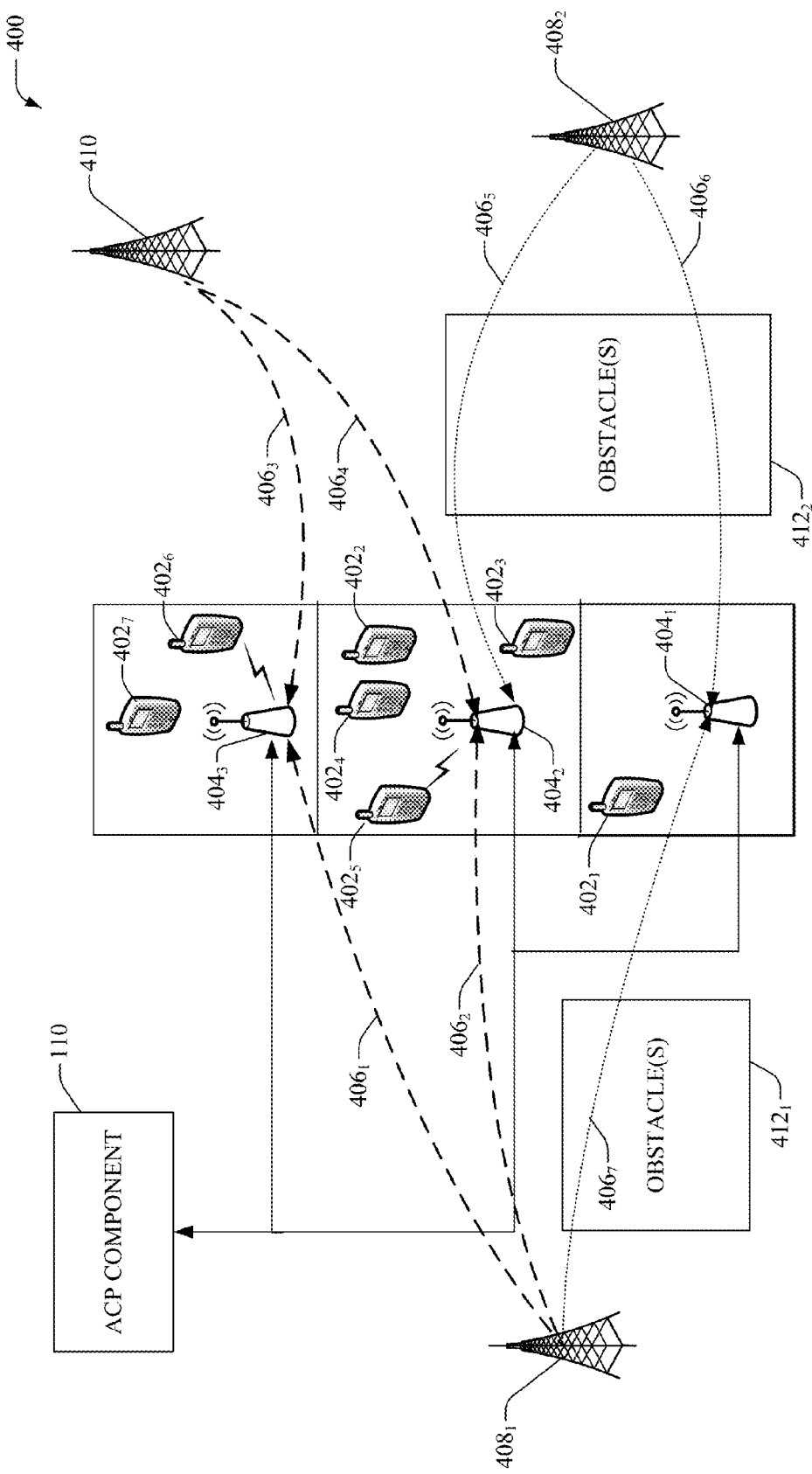
FIGS. 4A-B illustrate example systems that can improve and verify or validate the improvements in macro network coverage based on femtocell measurements.

FIG. 4A illustrates an example system 400 that can detect macro signal interference based on femtocell measurements, according to an aspect of the subject disclosure. System 400 includes one or more femtocells deployed within a macro cell(s), served by a base station(s). Although only three femtocells, served by their respective FAPs $404_1$-$404_3$, and are illustrated it can be appreciated that the subject disclosure is not that limited and most any number of femtocells can be deployed within the macro network. In addition, although only three macro access points, namely macro base station $408_1$, macro base station $408_2$, and interfering macro base station 410, are illustrated, most any number of base stations can be deployed within the system 400. Moreover, the FAPs $404_1$-$404_3$ can be substantially similar to FAP 102 and can include functionality, as more fully described herein, for example, with regard to systems 100-200. Further, the base stations ($408_1$, $408_2$, 410) can be substantially similar to base stations $104_1$-$104_M$ and can include functionality, as more fully described herein, for example, with regard to systems 100-200. Furthermore, the ACP component 110 can include functionality, as more fully described herein, for example, with regard to systems 100-300.

In one aspect, FAPs $404_1$-$404_3$ can monitor their surrounding radio conditions (e.g., by employing respective measurement components 212), for example, by performing a network listen procedure. As an example, during the network listen procedure, the FAPs $404_1$-$404_3$ can scan their radio environment for detecting neighboring base stations ($408_1$, $408_2$, 410). Various parameters associated with the base stations ($408_1$, $408_2$, 410) can be detected during the network listen procedure, such as, but not limited to, frequency bands, scrambling codes, common channel pilot power, UMTS Terrestrial Radio Access (UTRA) receive signal strength indicator, etc. In one example, these parameters can facilitate detection of hot spot locations. In addition, FAPs $404_1$-$404_2$ can also detect interference between macro access points. In this example scenario, during the network listen procedures, FAPs $404_2$-$404_3$ can detect base station 410 that interferes with (e.g., radio frequency interference $406_3$-$406_4$) base station $408_1$ and/or base station $408_2$. Further, FAPs $404_2$-$404_3$ can detect a strong or sufficient macro signal $406_1$-$406_2$ from a nearby base station $408_1$; while FAPs $404_1$-$404_2$ can detect comparatively weaker macro signals, $406_5$-$406_7$, due to presence of obstacles $412_1$-$412_2$, such as but not limited to buildings, hills, monuments, other environmental conditions, etc.

In addition, FAPs $404_1$-$404_3$ can collect, record, and/or compute (e.g., by employing the attachment detection component 202), a number of attachment attempts made by UEs ($402_1$-$404_7$) within a specific time period. Although only seven UEs ($402_1$-$404_7$) are illustrated, it can be appreciated that the subject disclosure is not that limited and a greater or lesser number of UEs can be present within the respective femtocell coverage areas. As an example, UEs can be whitelisted ($402_5$, $402_6$) or can be visitors ($402_1$-$402_4$, $404_7$). It can be appreciated that the UEs ($402_1$-$404_7$) disclosed herein can include most any electronic communication device, such as, but not limited to, a cell phone, a tablet, a digital media player, a gaming console, a digital camera, a video recorder, a PDA, a personal computer, laptop, etc. During an idle mode (e.g., before initiating a voice call), UEs ($402_1$-$404_7$) can attempt to attach to nearby FAPs $404_1$-$404_3$. The FAPs $404_1$-$404_3$ can report the number of attachment attempts made during a specific time period, to the ACP component 110, for example, via a femto network platform (not shown). In this example scenario, FAP $404_2$ can detect and report a high traffic area with a greater number of attachment attempts from UEs $402_2$-$404_5$; while FAPs $404_1$ and $404_3$ can detect a lower number of attachment attempts by UEs $402_1$ and $402_6$-$402_7$ respectively.

In one aspect, the FAPs $404_1$-$404_3$ can transfer data (e.g., measurement and/or attachment attempt data) to the ACP component 110 in real-time or at a specific time, for example, when the femtocell is idle, periodically, on demand (e.g., polling), in response to an event or trigger, etc. According to an embodiment, the ACP component 110 can collect, aggregate and/or consolidate reports (e.g., including measurement and/or attachment attempt data) received from FAPs $404_1$-$404_3$. Moreover, when the interference, number of FAP reports, and/or affected users (e.g., identified based on the attachment attempt data) exceeds respective thresholds, an ACP process is triggered. During the ACP process, the ACP component 110 can utilize the measurement data to identify the most significant victim (interfered) and/or rogue (interfering) macro sites requiring attention (e.g., by employing the analysis component 112). Further, the ACP component 110 can also utilize the measurement data to identify the magnitude of change (e.g., signal strength increase or interference reduction) required to meet a target performance criterion (e.g., by employing the analysis component 112). Moreover, the ACP component 110 can determine (e.g., by employing the analysis component 112) the best-fit and/or optimal changes (e.g., modifications to antenna tilt, antenna height, azimuth, beam width, etc.) required to affect the desired improvements for the majority of predicted subscribers (e.g., at FAP $404_2$) based in part on the attachment attempt data. Accordingly, the ACP component 110 can utilize femtocell measurements to determine issues relating to interfered and/or interfering macro sites, which when resolved will benefit the highest concentration of users.

Figure 4B:
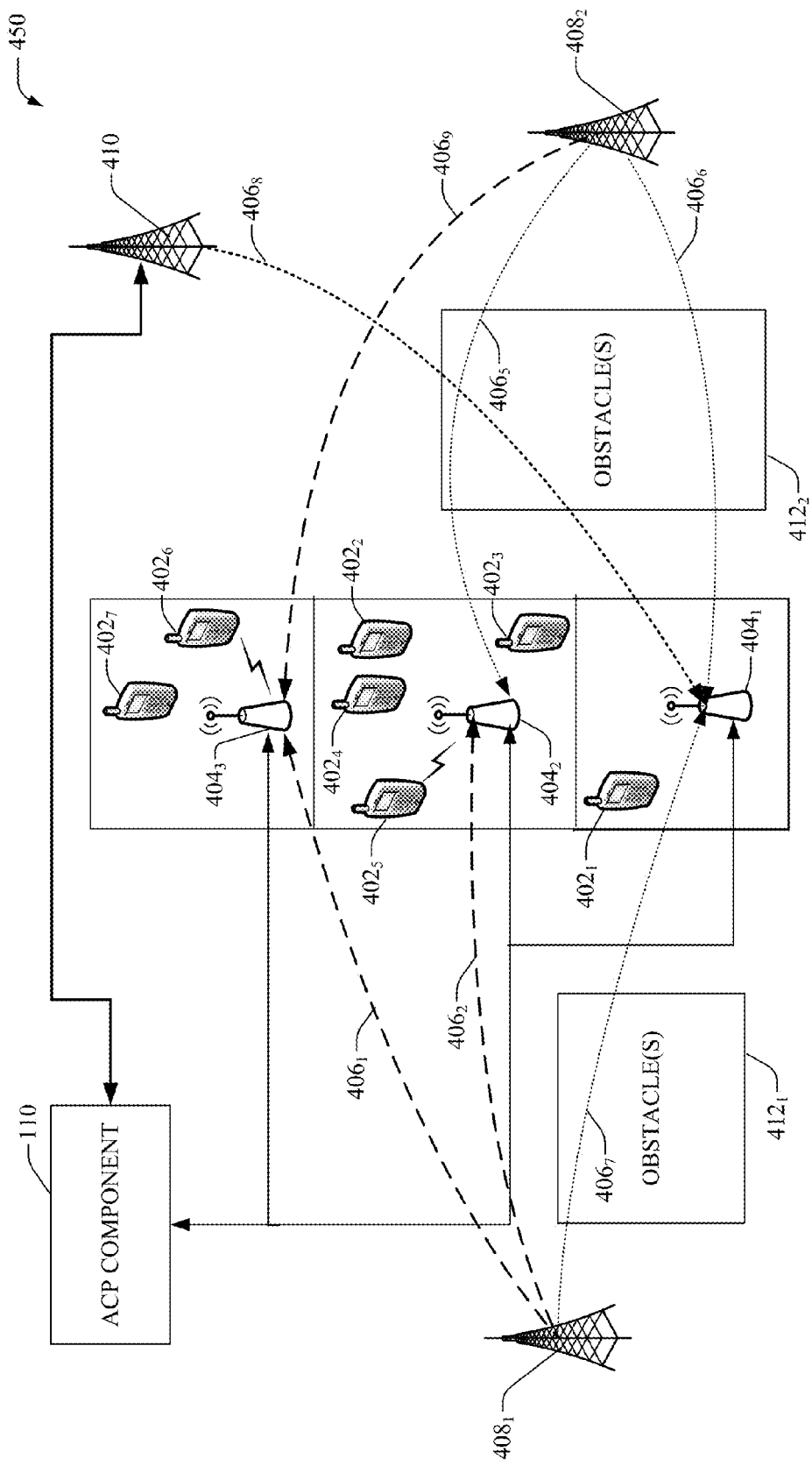

Referring now to FIG. 4B, there illustrated is an example system 450 that verifies improvements in macro network coverage based on feedback provided by femtocell measurements. Continuing with the example scenario disclosed above, after detecting the interference issue, the ACP component 110 can deliver an update to the macro base station 410 (e.g., by employing the communication component 302). Moreover, on receiving the update from the ACP component 110, the macro base station 410 can implement the changes, as instructed. In one aspect, once the changes are implemented by the base station 410, the ACP component 110 can instruct the FAPs $404_1$-$404_3$ to initiate a new network listen procedure. In this example scenario, FAPs $404_2$-$404_3$ can determine and report that the interference signals ($406_3$, $406_4$) are no longer detected. Further, FAPs $402_3$ can detect a strong or sufficient macro signal $406_9$ from base station $408_2$; while FAPs $404_1$ can detect a comparatively weaker macro signal, $406_8$ from base station 410. The ACP component 110 can asses the new data received from the FAPs $404_1$-$404_3$, to verify (e.g., via the verification component 116) that the changes implemented by the base station 410 achieve the target improvements in macro network coverage at the FAPs $404_1$-$404_3$ and/or do not create new interference and/or hot spot issues. If macro network coverage is not improved to the target/estimated amount, and/or new issues are created, the ACP component 110 can compute new changes (e.g., via the analysis component 112) and deliver the new changes to the base station 410 (e.g., via the communication component 302).

Figure 5:
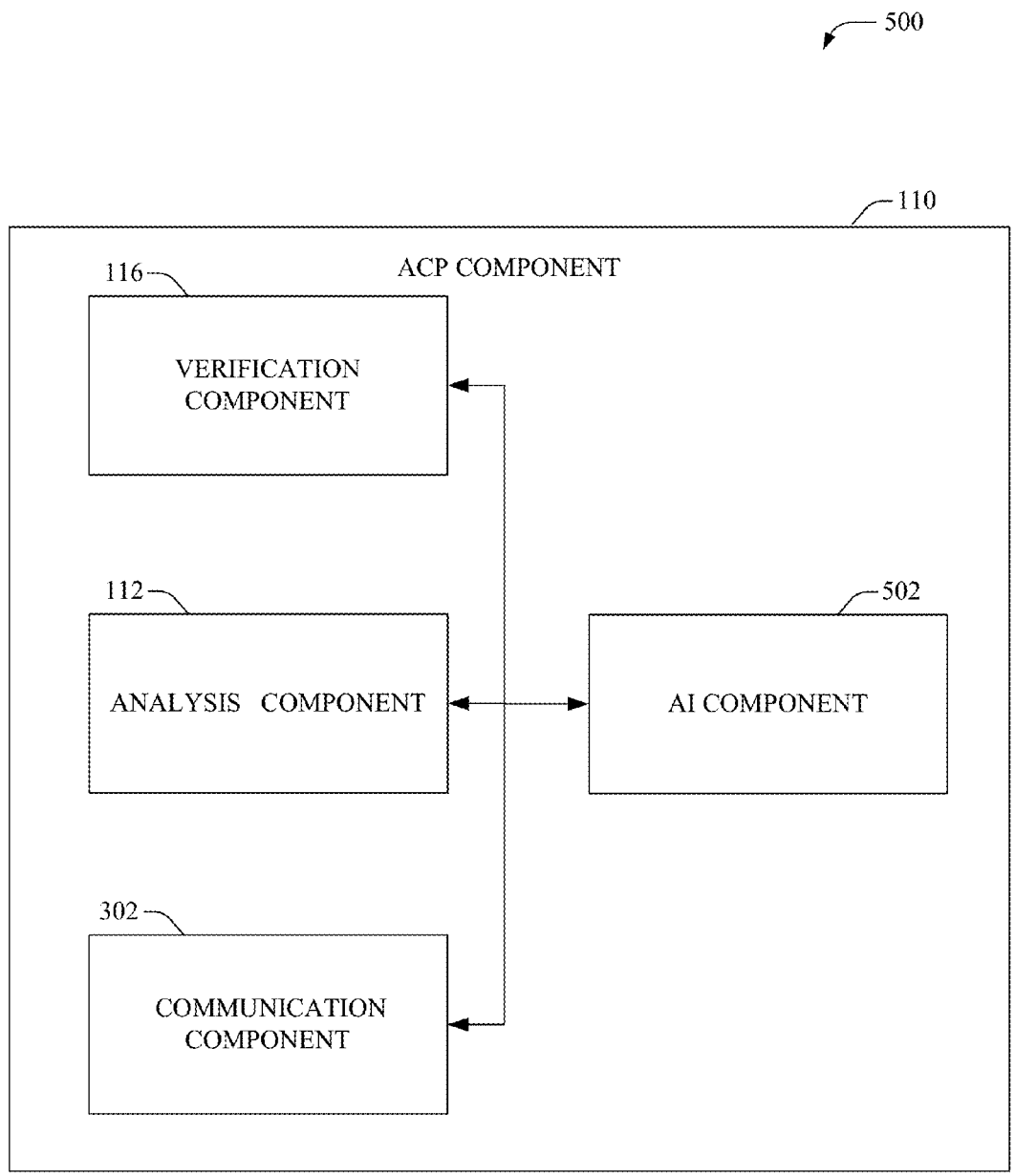
FIG. 5 illustrates an example system that facilitates automating one or more features in accordance with the subject disclosure.

Referring now to FIG. 5, there illustrated is an example system 500 that employs an artificial intelligence (AI) component 502, which facilitates automating one or more features in accordance with the subject embodiments. It can be appreciated that the ACP component 110, the analysis component 112, the verification component 116, and the communication component 302 can include respective functionality, as more fully described herein, for example, with regard to systems 100-450.

An example embodiment, system 500 (e.g., in connection with automatically identifying hot spot/dead zone locations and/or optimal transmission parameters) can employ various AI-based schemes for carrying out various aspects thereof. For example, a process for determining a location of a hot spot or a dead zone, determining interfering or interfered macro sectors, optimal parameters values for correcting and/or resolving weak macro coverage and/or issues, etc., can be facilitated via an automatic classifier system and process. Moreover, the classifier can be employed to determine a femtocell location that serves a large concentration of user, one or more macro base stations near the femtocell location, adjustments to one or more transmission parameters associated with the macro base stations, etc. A classifier can be a function that maps an input attribute vector, x=(x1, x2, x3, x4, xn), to a confidence that the input belongs to a class, that is, f(x) =confidence(class). Such classification can employ a probabilistic and/or statistical-based analysis (e.g., factoring into the analysis utilities and costs) to prognose or infer an action that a user desires to be automatically performed. In the case of communication systems, for example, attributes can be information received from FAPs, and the classes can be categories or areas of interest (e.g., levels of priorities). A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As will be readily appreciated from the subject specification, an example embodiment can employ classifiers that are explicitly trained (e.g., via a generic training data) as well as implicitly trained (e.g., via observing UE behavior, FAP reports, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria a location of weak macro coverage (e.g., in real-time), interference problems, one or more macro access points that can best serve the location, adjustments to transmission and/or operating parameters (e.g., antenna bearing, tilt, phase, etc.) for tuning a macro antenna beam, estimated macro network coverage change based on implementation of the parameter adjustments, etc. The criteria can include, but is not limited to, historical patterns, UE behavior, user preferences, service provider preferences and/or policies, FAP parameters/reports, location of the femtocell, location of the macro sites, etc.

Figure 6:
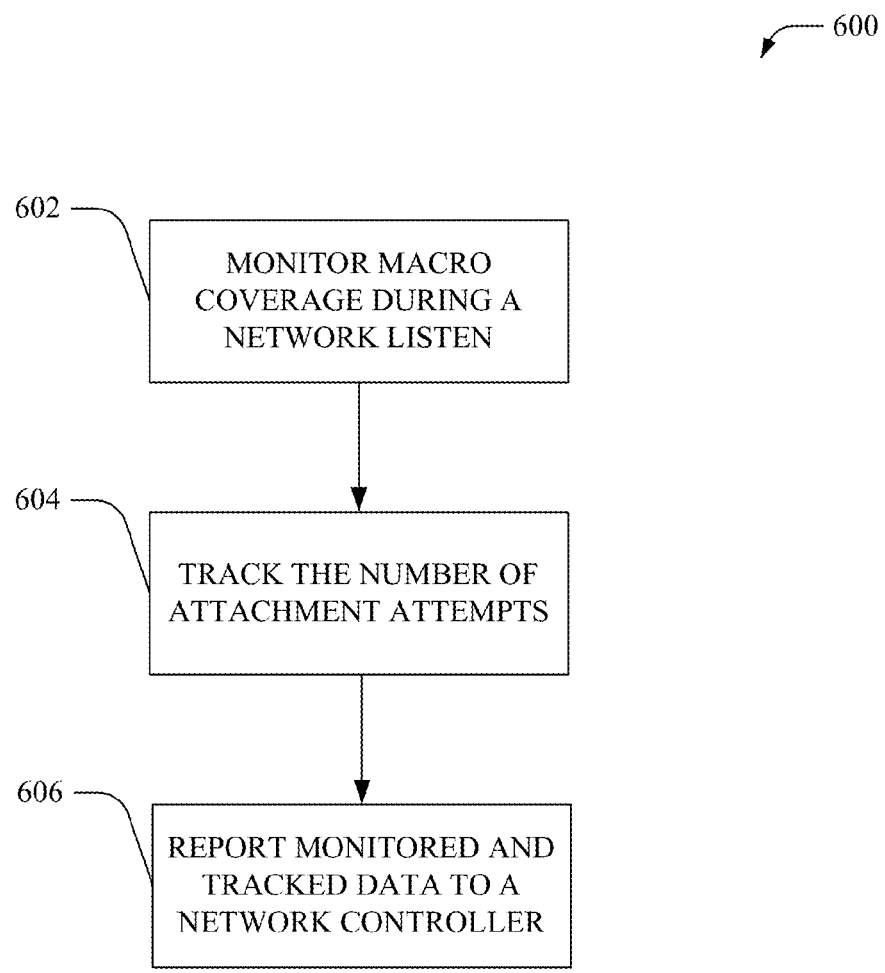
FIG. 6 illustrates an example methodology that can be utilized to report femto measurement and attachment data.
Figure 7:
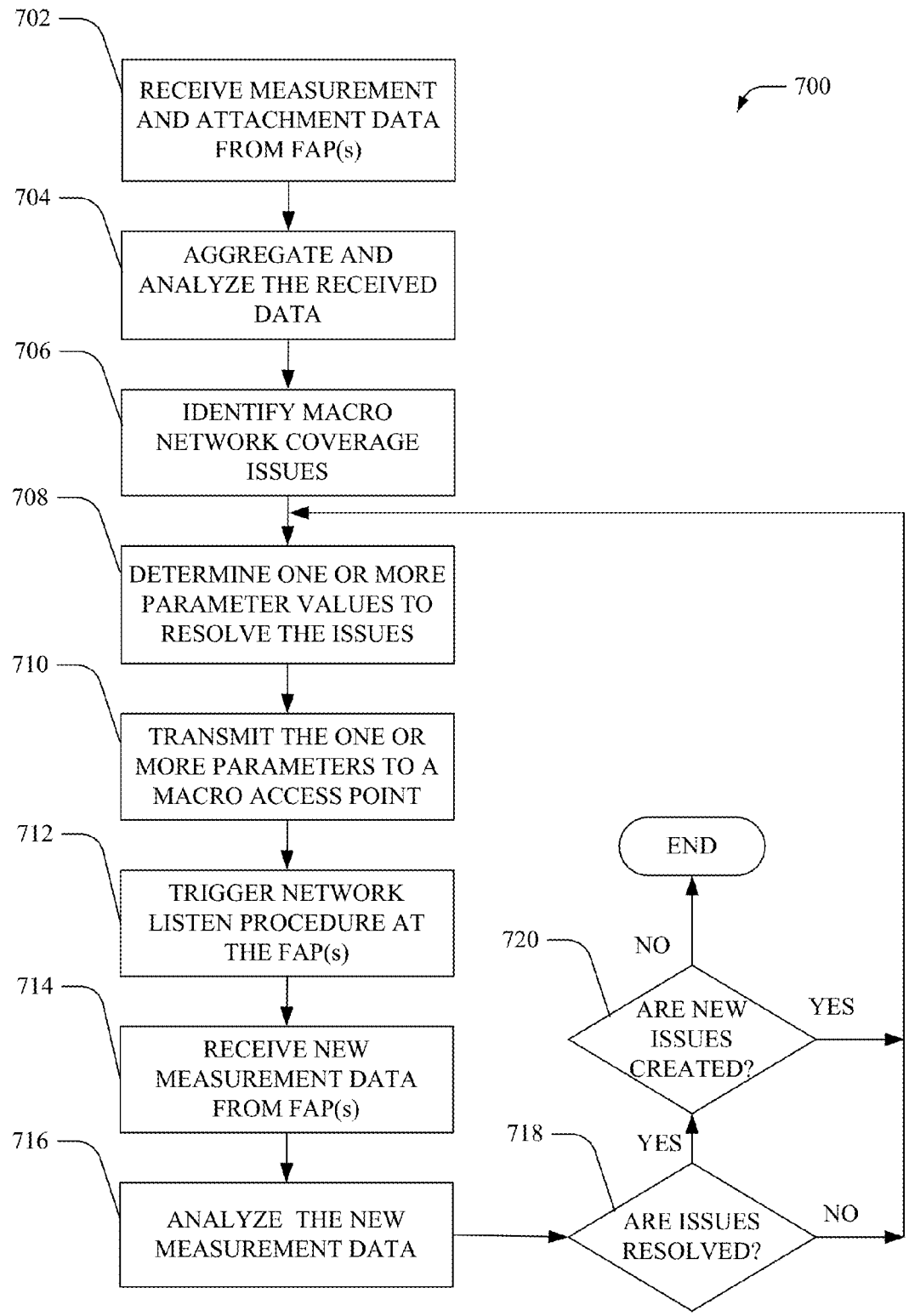
FIG. 7 illustrates an example methodology that can utilize femto measurements as a trigger and performance feedback mechanism for automated macro network adjustments.

FIGS. 6-7 illustrate methodologies and/or flow diagrams in accordance with the disclosed subject matter. For simplicity of explanation, the methodologies are depicted and described as a series of acts. It is to be understood and appreciated that the subject specification is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or computer-readable storage/communications media.

Referring now to FIG. 6, illustrated is an example methodology 600 that can be utilized to report femto attachment and measurement data, according to an aspect of the subject specification. A large number of FAPs are being deployed in the cellular network to improve indoor coverage and offload a mobility RAN. The location of each FAP is known at the time of activation and/or installation. This location data can be leveraged to identify a location of a weak macro network coverage and/or high user density. This can enable dynamic and efficient macro beam tuning and improve macro network quality perceived by the UEs at the location.

In one aspect, at 602, macro coverage, at a FAP, can be monitored, for example, by performing a network listen procedure (e.g., scanning RF environment). In one example, signal parameters such as, but not limited to, signal strength of a transmission from a macro base station(s), can be detected and interference issues (if any) can be detected. Further, at 602, the number of attachment attempts made by UE(s) to connect to the FAP can be tracked, for example, over a specified period of time. Additionally or optionally, the number of unique devices attempting to attach to the FAP can be identified, for example, based on an IMSI number of the device. Further, the number of whitelisted, blacklisted, and/or visitor UEs, attempting to camp on the FAP, can also be determined. At 606, monitored and tracked data can be reported (e.g., to an ACP component 110). The number of attachment attempts provides a gauge for estimating a number of subscribers that will benefit, if macro coverage is improved at the location of the FAP.

FIG. 7 illustrates an example methodology 700 that can utilize femto measurements as a trigger and a performance feedback mechanism for automated macro network adjustments in accordance with an aspect of the subject specification. At 702, measurement and attachment data can be received from FAPs, for example, that can be neighboring, surrounding, or within a predefined distance from one or more macro sites. As an example, the measurement data can be indicative of the signal strengths of available macro carriers at the respective FAP locations. The measurement data can be indicative of areas with weak coverage or interference (e.g., multiple servers overlapping at the location). Further, the attachment data can include a total number of attachment attempts, a number of attachment attempts made by whitelisted UEs, a number of attachment attempts made by blacklisted UEs, and/or a number of attachment attempts made by visitor UEs, to connect with a FAP. At 704, the received data can be aggregated/consolidated and analyzed. In one aspect, the analysis can include weighing the FAPs based on the attachment data. As an example, a FAP reporting a higher number of attachment attempts can be assigned a higher weight than a FAP reporting a lower number of attachment attempts.

Based on the analysis, at 706, one or more macro network coverage/interference issues, for example, poor network coverage and/or interference can be identified. Further, at 708, one or more parameter values can be determined to resolve the issues. Moreover, at 710, the one or more parameter values can be transmitted to a macro access point, which in turn can implement the update (e.g., tune an antenna array). Once the update has been implemented, at 712, a network listen procedure can be triggered at the FAPs. Moreover, at 714, new measurement data can be received and at 716, the new measurement data can be analyzed. At 718, it can be determined whether the macro network coverage and/or interference issues have been resolved. If the issues have not been resolved, the methodology 700 returns to 708 and new parameter values are determined. Alternatively, if the issues are resolved, at 720, it can be determined whether new issues (e.g., hot spots, dead zones, interferences) are created as a result of implementing the update. If new issues are created, the methodology 700 can return to 708 to determine new parameters. Else, if no new issues have been created, the methodology 700 can end.

Figure 8:
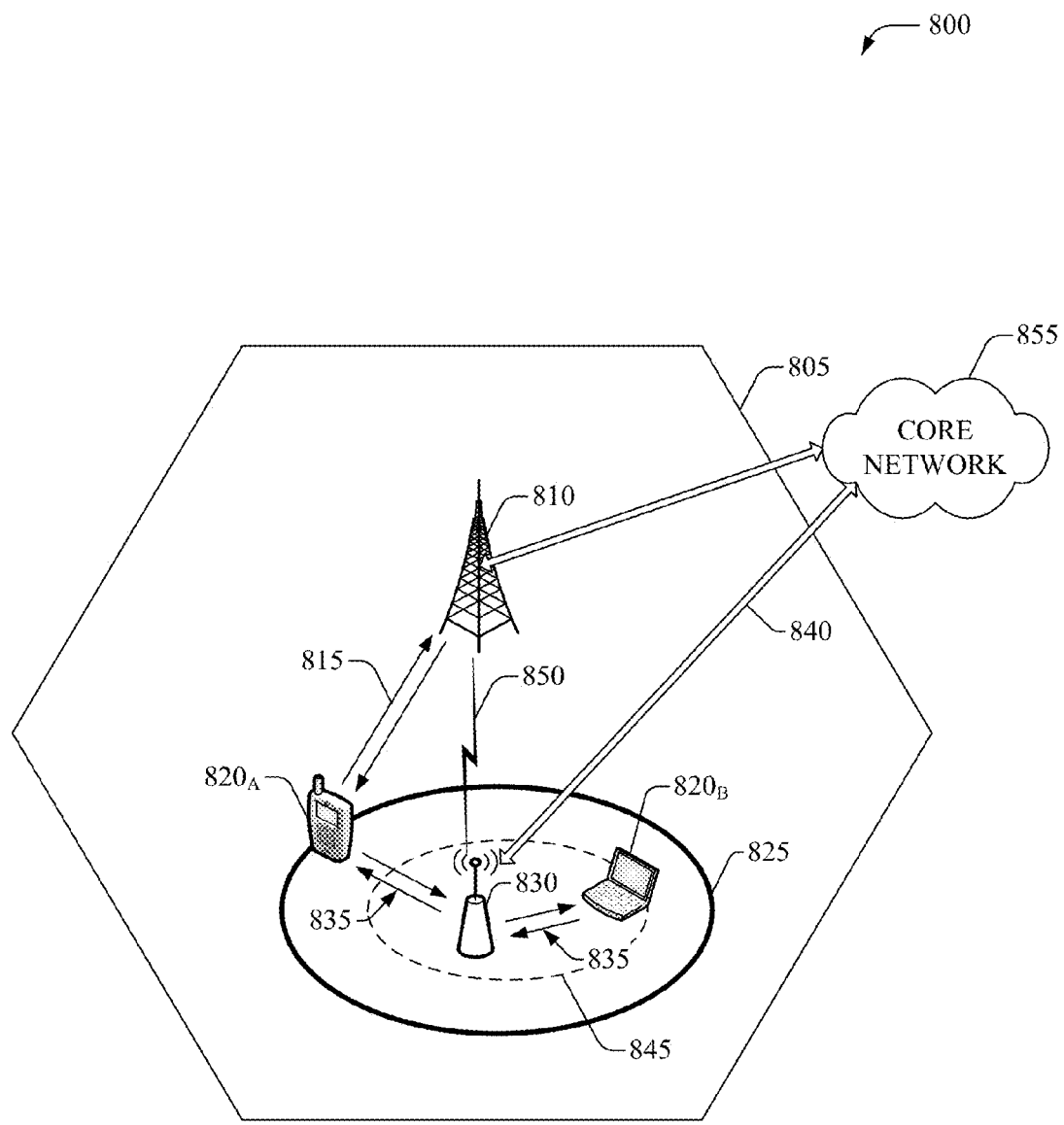
FIG. 8 illustrates an example wireless communication environment with associated components for operation of a femtocell in accordance with the subject specification.

FIG. 8 illustrates a schematic wireless environment 800 (e.g., a network) in which a femtocell can exploit various aspects of the subject specification in accordance with the disclosed subject matter. In wireless environment 800, area 805 can represent coverage macro cell, which can be served by base station 810. Macro coverage is generally intended for outdoors locations for servicing mobile wireless devices, like UE $820_A$, and such coverage is achieved via a wireless link 815. In an aspect, UE 820 can be a 3GPP Universal Mobile Telecommunication System (UMTS) mobile phone.

Within macro coverage cell 805, a femtocell 845, served by a femto access point 830, can be deployed. A femtocell can cover an area 825 that is determined, at least in part, by transmission power allocated to FAP 830, path loss, shadowing, and so forth. Coverage area can be spanned by a coverage radius that ranges from 20 to 50 meters, although many other ranges are available without departing from example embodiments. Confined coverage area 845 can be associated with an indoors area, or a building, which can span, for example, about 465 sq. meters. Generally, FAP 830 can service a number (e.g., a few or more) wireless devices (e.g., subscriber station $820_B$) within confined coverage area 845. In an aspect, FAP 830 can integrate seamlessly with substantially any PS-based and CS-based network; for instance, FAP 830 can integrate into an existing 3GPP Core via conventional interfaces like Iu-CS, Iu-PS, Gi, Gn. In another aspect, FAP 830 can exploit high-speed downlink packet access in order to accomplish substantive bitrates. In yet another aspect, FAP 830 has a LAC (location area code) and RAC (routing area code) that can be different from the underlying macro network. These LAC and RAC can be used to identify subscriber station location for a variety of reasons, for example to direct incoming voice and data traffic to appropriate paging transmitters.

As a subscriber station, e.g., UE $820_A$, can leave macro coverage (e.g., cell 805) and enters femtocell coverage (e.g., area 825), as illustrated in environment 800. A carrier frequency scan can be triggered by the UE $820_A$, which can detect the FAP 830. UE $820_A$ can attempt to attach to the FAP 830 through transmission and reception of attachment signaling, effected via a FL/RL 835; in an aspect, the attachment signaling can include a Location Area Update (LAU) and/or Routing Area Update (RAU). Attachment attempts are a part of procedures to ensure mobility, so voice calls and sessions can continue even after a macro-to-femto transition or vice versa. It is to be noted that UE 820 can be employed seamlessly after either of the foregoing transitions. Femto networks are also designed to serve stationary or slow-moving traffic with reduced signaling loads compared to macro networks. A femto service provider (e.g., an entity that commercializes, deploys, and/or utilizes FAP 830) therefore can be inclined to minimize unnecessary LAU/RAU signaling activity at substantially any opportunity to do so, and through substantially any available means. It is to be noted that substantially any mitigation of unnecessary attachment signaling/control can be advantageous for femtocell operation. Conversely, if not successful, UE 820 generally can be commanded (through a variety of communication means) to select another LAC/RAC or enter "emergency calls only" mode. It is to be appreciated that this attempt and handling process can occupy significant UE battery, and FAP capacity and signaling resources as well.

When an attachment attempt is successful, UE 820 can be allowed on femtocell 825 and incoming voice and data traffic can be paged and routed to the subscriber station through the FAP 830. It is to be noted also that data traffic can be routed through a backhaul broadband wired network backbone 840 (e.g., optical fiber backbone, twisted-pair line, T1/E1 phone line, DSL, or coaxial cable). It is to be noted that as a FAP 830 generally can rely on a backhaul network backbone 840 for routing and paging, and for packet communication, substantially any quality of service can handle heterogeneous packetized traffic. Namely, packet flows established for wireless communication devices (e.g., terminals $820_A$ and $820_B$) served by FAP 830, and for devices served through the backhaul network pipe 840. It is to be noted that to ensure a positive subscriber experience, or perception, it can be desirable in an example embodiment for FAP 830 to maintain a high level of throughput for traffic (e.g., voice and data) utilized on a mobile device for one or more subscribers while in the presence of external, additional packetized, or broadband, traffic associated with applications (e.g., web browsing, data transfer (e.g., content upload), and the like) executed in devices within the femtocell coverage area (e.g., area 825 or area 845).

Figure 9:
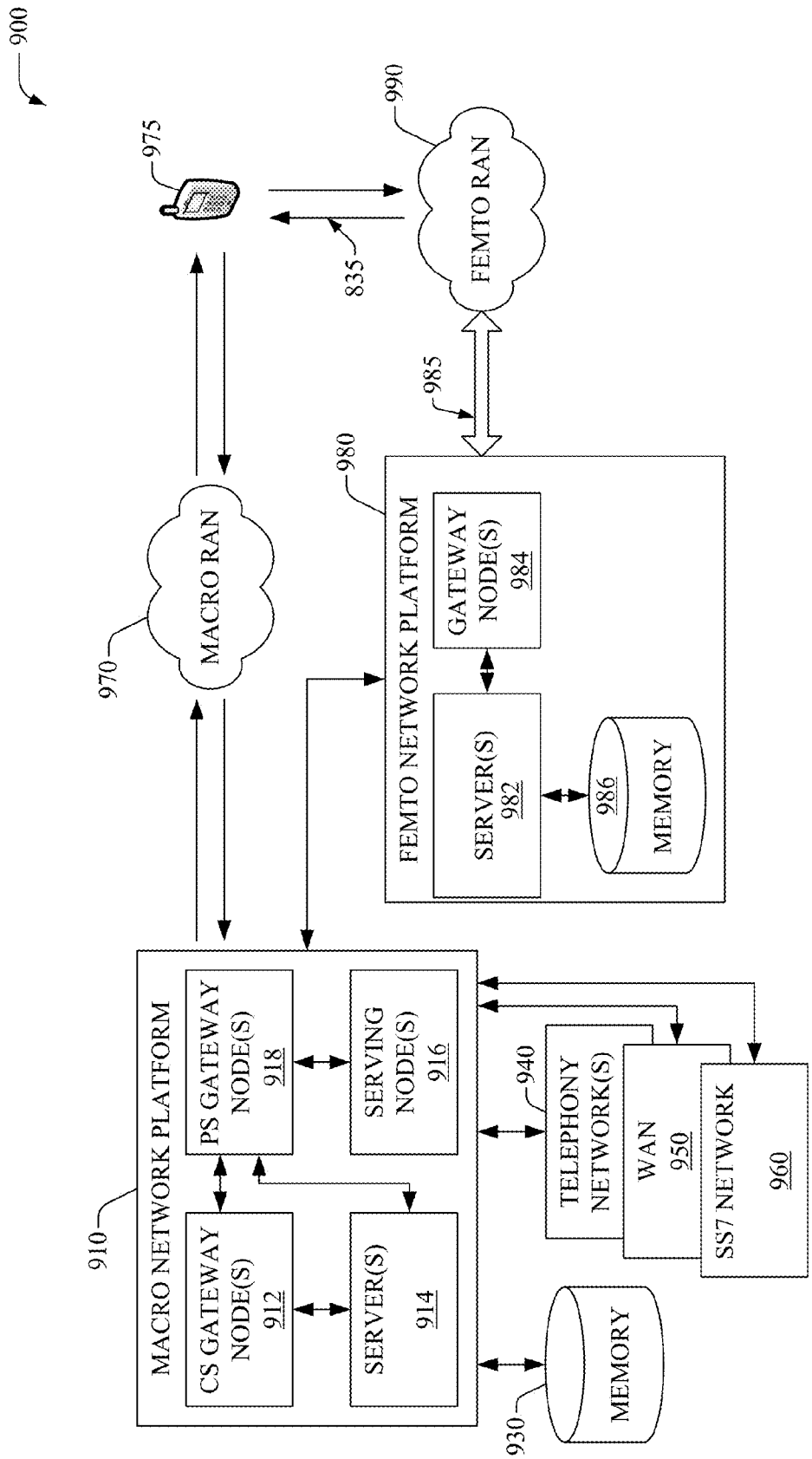
FIG. 9 illustrates a schematic deployment of a macro cell and a femtocell for wireless coverage in accordance with aspects of the disclosure.
Figure 10:
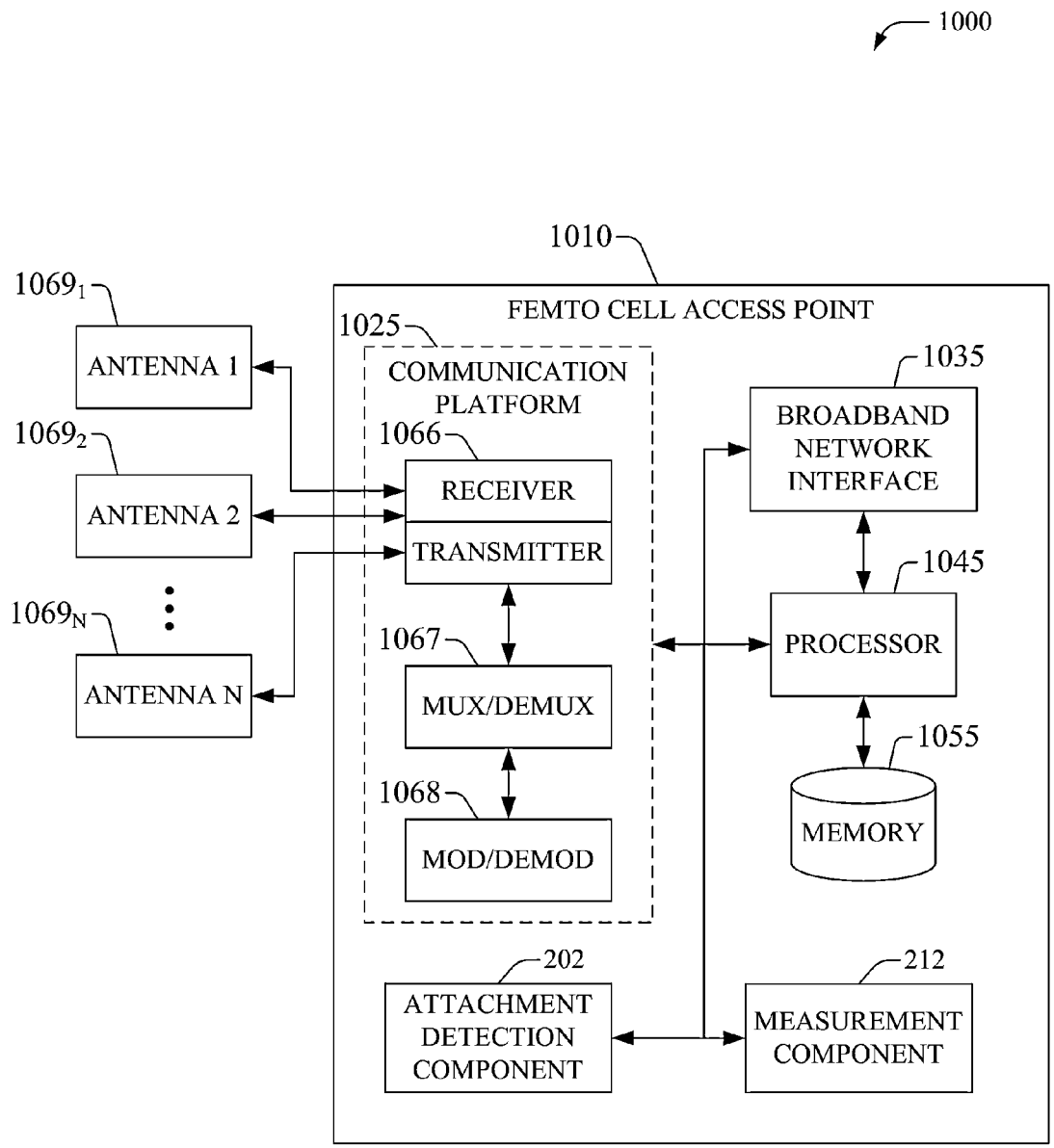
FIG. 10 illustrates an example embodiment of a femto access point that can report femto measurements to facilitate and verify improvement in macro coverage, according to the subject disclosure.

To provide further context for various aspects of the subject specification, FIGS. 9 and 10 illustrate, respectively, an example wireless communication environment 900, with associated components for operation of a femtocell, and a block diagram of an example embodiment 1000 of a femto access point, which can facilitate detection of an area with weak macro network coverage and verification of improvement at the area, by utilizing femto measurements in accordance with aspects described herein.

Wireless communication environment 900 includes two wireless network platforms: (i) A macro network platform 910 that serves, or facilitates communication) with user equipment 975 via a macro radio access network (RAN) 970. It should be appreciated that in cellular wireless technologies (e.g., 3GPP UMTS, HSPA, 3GPP LTE, 3GPP UMB, 4G LTE, etc.), macro network platform 910 is embodied in a Core Network; and (ii) A femto network platform 980, which can provide communication with UE 975 through a femto RAN 990 linked to the femto network platform 980 via backhaul pipe(s) 985, wherein backhaul pipe(s) are substantially the same a backhaul link 840. It should be appreciated that femto network platform 980 can offload UE 975 from macro network, once UE 975 attaches (e.g., through macro-to-femto handover, or via a scan of channel resources in an idle mode) to femto RAN.

It is noted that RAN includes base station(s), or access point(s), and its associated electronic circuitry and deployment site(s), in addition to a wireless radio link operated in accordance with the base station(s). Accordingly, macro RAN 970 can comprise various coverage cells like cell 805, while femto RAN 990 can comprise multiple femtocell access points. As mentioned above, it is to be appreciated that deployment density in femto RAN 990 is substantially higher than in macro RAN 970.

Both macro and femto network platforms 910 and 980 can include components, e.g., nodes, gateways, interfaces, servers, or platforms, that facilitate both packet-switched (PS) and circuit-switched (CS) traffic (e.g., voice and data) and control generation for networked wireless communication. For example, macro network platform 910 includes CS gateway node(s) 912 which can interface CS traffic received from legacy networks like telephony network(s) 940 (e.g., public switched telephone network (PSTN), or public land mobile network (PLMN)) or a SS7 network 960. Moreover, CS gateway node(s) 912 interfaces CS-based traffic and signaling and gateway node(s) 918.

In addition to receiving and processing CS-switched traffic and signaling, gateway node(s) 918 can authorize and authenticate PS-based data sessions with served (e.g., through macro RAN) wireless devices. Data sessions can include traffic exchange with networks external to the macro network platform 910, like wide area network(s) (WANs) 950; it should be appreciated that local area network(s) (LANs) can also be interfaced with macro network platform 910 through gateway node(s) 918. Gateway node(s) 918 generates packet data contexts when a data session is established. It should be further appreciated that the packetized communication can include multiple flows that can be generated through server(s) 914. Macro network platform 910 also includes serving node(s) 916 that conveys the various packetized flows of information, or data streams, received through gateway node(s) 918. It is to be noted that server(s) 914 can include one or more processors configured to confer at least in part the functionality of macro network platform 910. To that end, one or more processors can execute code instructions stored in memory 930 or other computer-readable medium, for example.

In example wireless environment 900, memory 930 can store information related to operation of macro network platform 910. Information can include business data associated with subscribers; market plans and strategies, e.g., promotional campaigns, business partnerships; operational data for mobile devices served through macro network platform; service and privacy policies; end-user service logs for law enforcement; and so forth. Memory 930 can also store information from at least one of telephony network(s) 940, WAN(s) 950, or SS7 network 960. Many different types of information can be stored in memory 930 without departing from example embodiments.

Femto gateway node(s) 984 can have substantially the same functionality as PS gateway node(s) 918. Additionally, femto gateway node(s) 984 can also include substantially all functionality of serving node(s) 916. In an aspect, femto gateway node(s) 984 can facilitate handover resolution, e.g., assessment and execution. Server(s) 982 have substantially the same functionality as described in connection with server(s) 914 and can include one or more processors configured to confer at least in part the functionality of macro network platform 910. Moreover, the ACP component 110 can be implemented or executed by server(s) 982 and/or server(s) 914. To that end, the one or more processor can execute code instructions stored in memory 986, for example.

Memory 986 can include information relevant to operation of the various components of femto network platform 980. For example operational information that can be stored in memory 986 can comprise, but is not limited to, subscriber information; contracted services; maintenance and service records; femtocell configuration (e.g., devices served through femto RAN 990; access control lists, or white lists); service policies and specifications; privacy policies; add-on features; femto measurement data, and so forth.

With respect to FIG. 10, in example embodiment 1000, femtocell AP 1010 can receive and transmit signal(s) (e.g., traffic and control signals) from and to wireless devices, access terminals, wireless ports and routers, etc., through a set of antennas $1069_1$-$1069_N$. It should be appreciated that while antennas $1069_1$-$1069_N$ are a part of communication platform 1025, which comprises electronic components and associated circuitry that provides for processing and manipulating of received signal(s) (e.g., a packet flow) and signal(s) (e.g., a broadcast control channel) to be transmitted. In an aspect, communication platform 1025 can include a transmitter/receiver (e.g., a transceiver) 1066 that can convert signal(s) from analog format to digital format (e.g., analog-to-digital conversion) upon reception, and from digital format to analog (e.g., digital-to-analog conversion) format upon transmission. In addition, receiver/transmitter 1066 can divide a single data stream into multiple, parallel data streams, or perform the reciprocal operation. Coupled to transceiver 1066 is a multiplexer/demultiplexer 1067 that facilitates manipulation of signal in time and/or frequency space. Electronic component 1067 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM), etc. In addition, mux/demux component 1067 can scramble and spread information (e.g., codes) according to substantially any code known in the art; e.g., Hadamard-Walsh codes, Baker codes, Kasami codes, polyphase codes, and so on. A modulator/demodulator 1068 is also a part of operational group 1025, and can modulate information according to multiple modulation techniques, such as frequency modulation, amplitude modulation (e.g., M-ary quadrature amplitude modulation (QAM), with M a positive integer), phase-shift keying (PSK), and the like.

FAP 1010 also includes a processor 1045 configured to confer functionality, at least partially, to substantially any electronic component in the femto access point 1010, in accordance with aspects of the subject disclosure. In particular, processor 1045 can facilitate FAP 1010 to implement configuration instructions received through communication platform 1025, which can include storing data in memory 1055. In addition, processor 1045 facilitates FAP 1010 to process data (e.g., symbols, bits, or chips, etc.) for multiplexing/demultiplexing, such as effecting direct and inverse fast Fourier transforms, selection of modulation rates, selection of data packet formats, inter-packet times, etc. Moreover, processor 1045 can manipulate antennas $1069_1$-$1069_N$ to facilitate beamforming or selective radiation pattern formation, which can benefit specific locations (e.g., basement, home office . . . ) covered by FAP; and exploit substantially any other advantages associated with smart-antenna technology. Memory 1055 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1055 can store configuration information such as schedules and policies; FAP address(es) or geographical indicator(s); access lists (e.g., white lists);

license(s) for utilization of add-features for FAP 1010, and so forth. In one example, data store 206 can be implemented in memory 1055.

In embodiment 1000, processor 1045 can be coupled to the memory 1055 in order to store and retrieve information necessary to operate and/or confer functionality to communication platform 1025, broadband network interface 1035 (e.g., a broadband modem), and other operational components (e.g., multimode chipset(s), power supply sources . . . ; not shown) that support femto access point 1010. The FAP 1010 can further include an attachment detection component 202 and measurement component 212, which can include functionality, as more fully described herein, for example, with regard to systems 200. In addition, it is to be noted that the various aspects disclosed in the subject specification can also be implemented through (i) program modules stored in a computer-readable storage medium or memory (e.g., memory 986 or memory 1055) and executed by a processor (e.g., processor 1045), or (ii) other combination(s) of hardware and software, or hardware and firmware.

Figure 11:
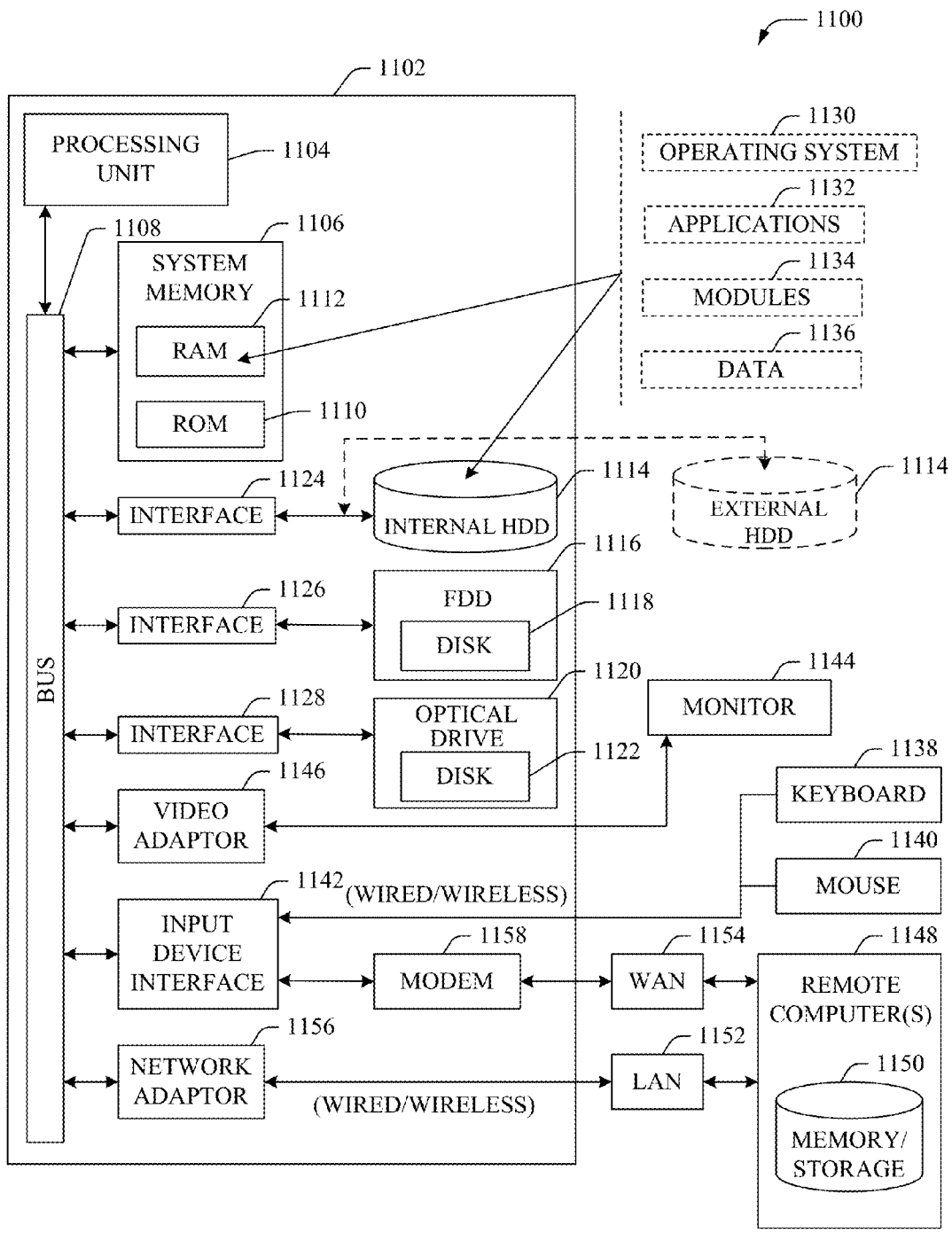
FIG. 11 illustrates a block diagram of a computer operable to execute the disclosed communication architecture.

Referring now to FIG. 11, there is illustrated a block diagram of a computer operable to execute the disclosed communication architecture. In order to provide additional context for various aspects of the subject specification, FIG. 11 and the following discussion are intended to provide a brief, general description of a suitable computing environment 1100 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments, including cloud-computing environments, where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically include (and/or facilitate the transmission of) computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media.

With reference again to FIG. 11, the example environment 1100 for implementing various aspects of the specification includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the specification can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are example and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. In an example embodiment, wireless communications can be facilitated, for example, using Wi-Fi, Bluetooth™, Zigbee, and other 802.XX wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks can operate in the unlicensed 2.4 and 5 GHz radio bands, at an 11 Mbps (802.11a), 54 Mbps (802.11b), or 150 Mbps (802.11n) data rate, for example, or with products that contain both bands (dual band), so the networks can provide real-world performance similar to wired Ethernet networks used in many homes and/or offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nanoscale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory(s) or nonvolatile memory(s), or can include both volatile and nonvolatile memory(s).

By way of illustration, and not limitation, nonvolatile memory(s) can include read only memory (ROM), programmable ROM (PROM), electrically programmable ROM (EPROM), electrically erasable ROM (EEPROM), or flash memory. Volatile memory(s) can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "module," "system," "interface," "platform," "service," "framework," "connector," "controller," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
evaluating measurement data received from a femto access point device to determine a characteristic of a coverage area of network devices of a macro network;
in response to the characteristic being determined to satisfy a threshold, directing a transmission, to a macro access point device of the network devices serving the coverage area of the network devices of the macro network, of an instruction that facilitates tuning of an antenna associated with the macro access point device; and
in response to the tuning of the antenna, determining, based on an updated evaluation of updated measurement data received from the femto access point device, an alteration of a coverage of the coverage area of the network devices of the macro network.

2. The system of claim 1, wherein the operations further comprise:
evaluating the alteration of the coverage of the coverage area of the network devices of the macro network, as a result of performance of the instruction, to determine whether the characteristic of the coverage area of the network devices of the macro network is altered to a target level.

3. The system of claim 2, wherein the operations further comprise:
in response to determining the characteristic of the coverage area of the network devices of the macro network is not altered to the target level, directing a disparate transmission, to the macro access point device of the network devices serving the coverage area, of a disparate instruction that facilitates tuning of the antenna associated with the macro access point device.

4. The system of claim 3, wherein the instruction and the disparate instruction comprise respective adjustment instructions to adjust a transmission parameter associated with the antenna.

5. The system of claim 2, wherein the operations further comprise:
in response to determining that the characteristic of the coverage area of the network devices of the macro network has been altered to the target level, evaluating the updated measurement data received from the femto access point device to determine whether another characteristic of the coverage area of the network devices of the macro network meets another threshold.

6. The system of claim 1, wherein the operations further comprise:
determining that the characteristic of the coverage area of the network devices of the macro network satisfies a condition defining a hot spot based on an evaluation of access requests to the femto access point device.

7. The system of claim 6, wherein the operations further comprise:
based on the evaluation of access requests to the femto access point device, determining the instruction that facilitates the tuning of the antenna associated with the macro access point device.

8. The system of claim 7, wherein the determining the instruction that facilitates the tuning of the antenna associated with the macro access point device further comprises:
determining weights, associated with access requests to the femto access point device, that define respective priorities associated with the femto access point device; and
based on the weights, determining the instruction that facilitates the tuning of the antenna associated with the macro access point device.

9. The system of claim 1, wherein the operations further comprise:
based on the measurement data received from the femto access point device, determining whether the characteristic of the coverage area of the network devices of the macro network satisfies the threshold defining a weak signal strength associated with the macro access point device.

10. A method, comprising:

analyzing, by a system comprising a processor, data received from a femto access point device and representing a characteristic of a macro network coverage of a set of macro network devices;

based on the characteristic of the macro network coverage being determined to satisfy a threshold value, initiating, by the system, a transmission of an instruction to modify a transmission parameter associated with a macro access point device of the set of macro network devices; and in response to modifying the transmission parameter of the macro network coverage, monitoring, by the system, an alteration indicative of the characteristic of the macro network coverage based on updated data representing an update to the data.

11. The method of claim 10, further comprising:

in response to the modifying the transmission parameter associated with the macro access point device, initiating, by the system, reception of the updated data indicative of a result of the modifying the transmission parameter.

12. The method of claim 10, further comprising:

based on the characteristic of the macro network coverage, selecting, by the system, the macro access point device.

13. The method of claim 10, further comprising:

based on the characteristic of the macro network coverage, determining, by the system, the instruction to modify the transmission parameter associated with the macro access point device.

14. The method of claim 13, wherein the determining the instruction to modify the transmission parameter associated with the macro access point device further comprises determining a modification instruction for modification of the transmission parameter associated with the macro access point device to achieve a target level associated with the characteristic.

15. The method of claim 14, wherein the determining the modification instruction for modification of the transmission parameter associated with the macro access point device to achieve the target level associated with the characteristic further comprises determining the instruction based on an evaluation of access requests to the femto access point device.

16. The method of claim 15, wherein the determining the instruction based on the evaluation of the access requests to the femto access point device further comprises comparing the evaluation of the access requests to the femto access point device with disparate access requests to another femto access point device different than the femto access point device.

17. The method of claim 10, wherein the modifying the transmission parameter further comprises initiating the transmission of the instruction to the macro access point device to modify a beam width associated with an antenna of the macro access point device.

18. A non-transitory computer-readable storage device having instructions stored thereon that, in response to execution, cause a system comprising a processor to perform operations, comprising:

receiving data, from a femto access point device, during a network listen procedure;

determining a modification to a transmission parameter, associated with a macro access point device of a macro network, based on an analysis of the data and a target characteristic;

initiating transmission of an instruction to the macro access point device to implement the modification; and after the initiating the transmission of the instruction to implement the modification, determining, based on feedback data received from the femto access point device, an alteration in a coverage of macro network devices of the macro network resulting from the modification.

19. The non-transitory computer-readable storage device of claim 18, wherein the operations further comprise:

after the initiating the transmission of the instruction to implement the modification, determining, based on updated data indicative of a result of the modification and received from the femto access point device, whether a characteristic of the macro network has been determined to satisfy the target characteristic.

20. The non-transitory computer-readable storage device of claim 19, wherein the operations further comprise:

selecting the macro access point device for the modification of the transmission parameter of the macro access point device based on access requests to the femto access point device.

* * * * *